Figure 1:
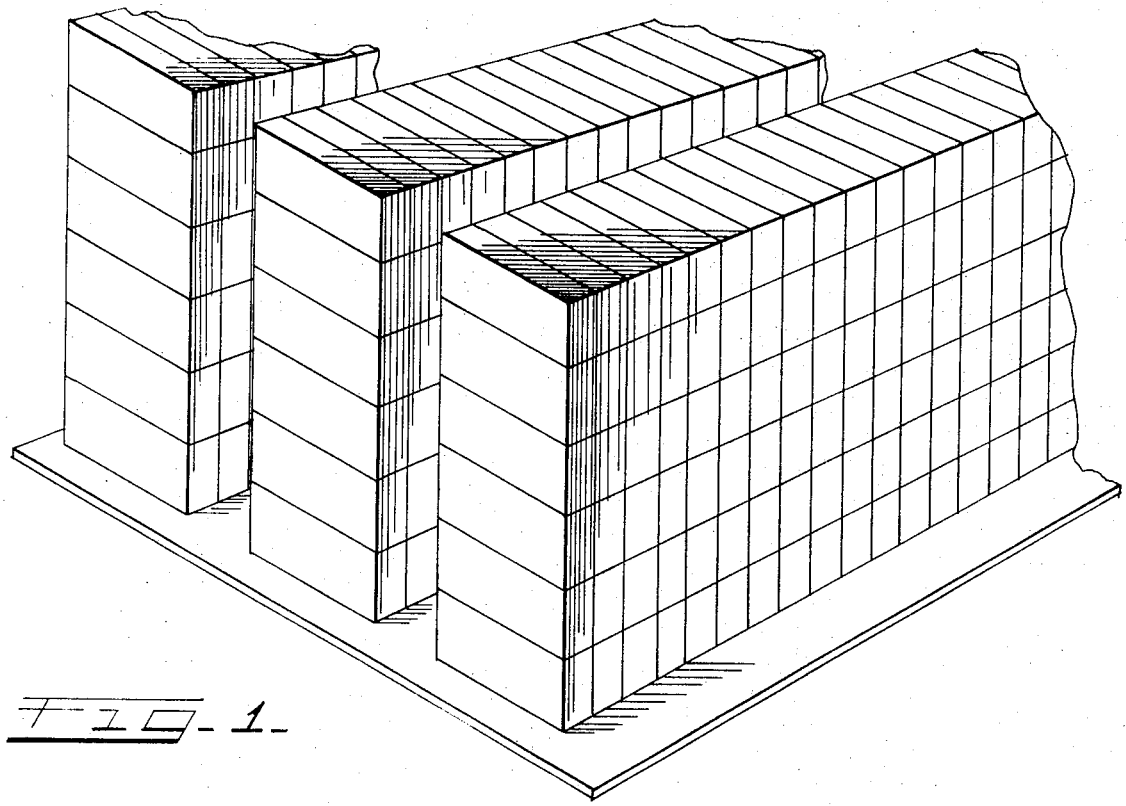

United States Patent [19]
Parsons et al.

[11] 3,842,760
[45] Oct. 22, 1974

[54] REFRACTORY COMPOSITION AND SHAPED ARTICLE CONTAINING CARBON AND SILICON

[75] Inventors: Joseph R. Parsons, Park Forest; Harold L. Rechter, Chicago, both of Ill.

[73] Assignee: Chicago Five Brick Company, Chicago, Ill.

[22] Filed: Aug. 4, 1972

[21] Appl. No.: 278,038

Related U.S. Application Data

[63] Continuation-in-part of Ser. No. 241,785, April 6, 1972.

[52] U.S. Cl. .................................................. 106/56
[51] Int. Cl. ............................................. C04b 35/52
[58] Field of Search ........................................ 106/56

[56] References Cited
UNITED STATES PATENTS

| | | | |
|---|---|---|---|
| 1,483,507 | 2/1924 | Brockbank | 106/56 |
| 2,013,625 | 9/1935 | Buck | 105/56 |
| 2,104,841 | 1/1938 | White | 106/56 |
| 2,772,176 | 11/1956 | Leitten | 106/56 |
| 3,037,756 | 6/1962 | Ornitz | 106/56 |
| 3,227,566 | 1/1966 | Hilton et al. | 106/56 |
| 3,352,549 | 11/1967 | Ornitz et al. | 106/56 |
| 3,637,412 | 1/1972 | Felice et al. | 106/56 |

*Primary Examiner*—James E. Poer
*Attorney, Agent, or Firm*—Foster York

[57] ABSTRACT

A refractory composition consisting essentially of 20–80 per cent carbon 4–30 percent silicon for ferro-silicon, and the balance of clay, grog, alumina, bentonite, bauxite or zircon. This composition is formed to a desired shape and fired at a temperature of 2,400°F – 3,200°F. Preferably the shaped composition is heated quickly through a temperature of 800°F – 2,500°F in no more than 4 hours and fired at above 2,500°F for at least 3 hours. Instead of firing the brick the composition may include chemical bonding agents such as sodium silicate, aluminum phosphates, ammonium phosphates and phosphoric acid, and the shaped composition simply dried to remove water and form a bonded article.

1 Claim, 4 Drawing Figures

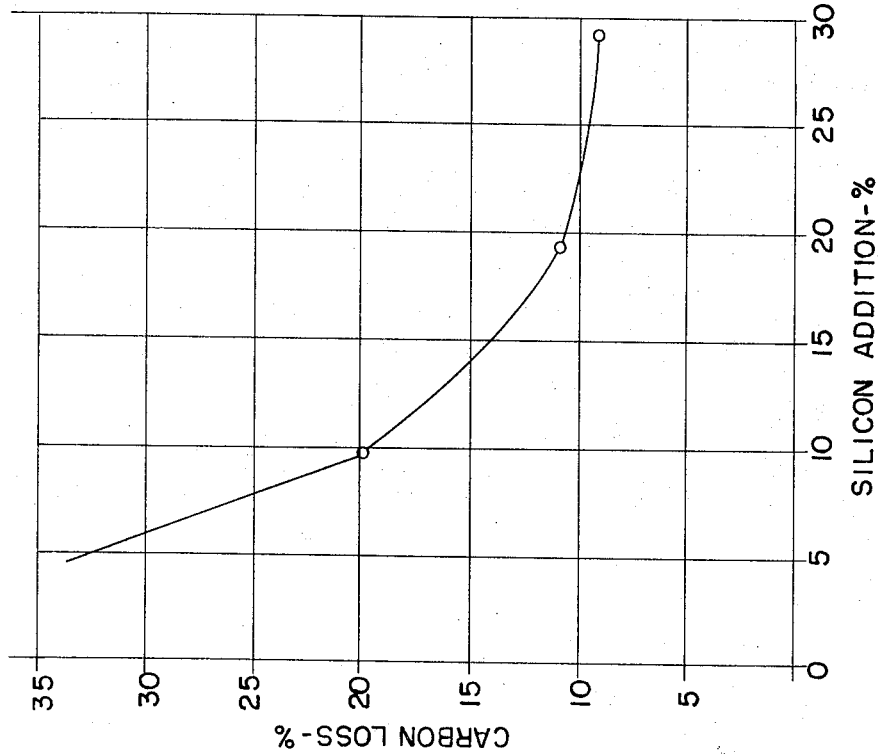
FIG. 4. — EFFECT OF SILICON CONTENT ON CARBON LOSS ON FIRING GRAPHITE BRICK AT 2550°F OPEN FIRE
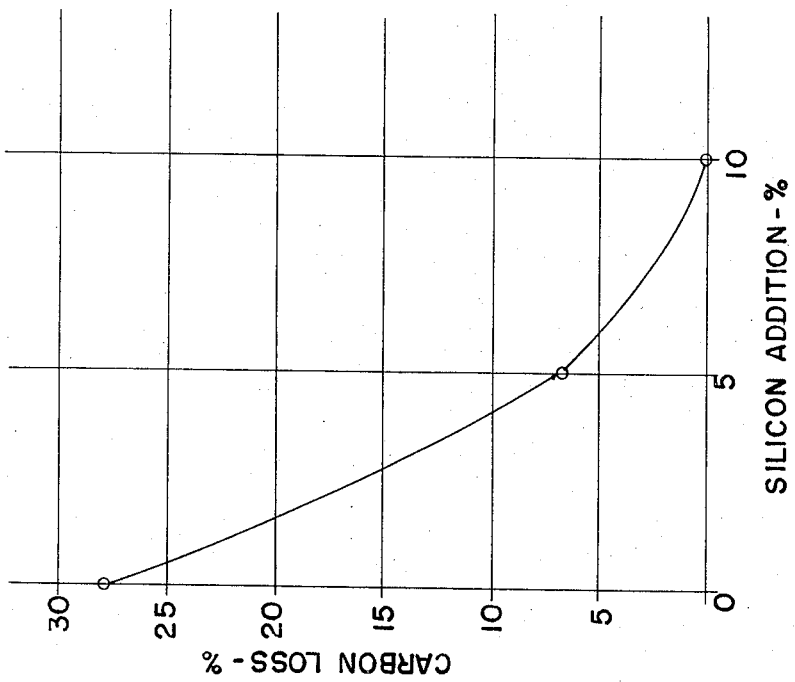
FIG. 3. — EFFECT OF SILICON CONTENT ON CARBON LOSS ON FIRING BAUXITE-CARBON BRICK AT 2550°F.

REFRACTORY COMPOSITION AND SHAPED ARTICLE CONTAINING CARBON AND SILICON

CROSS REFERENCE TO RELATED APPLICATION

This application is a continuation-in-part of our copending application Ser. No. 241,785, filed Apr. 6, 1972, the disclosure of which, to the extent consistent with this application, is hereby incorporated by reference.

BACKGROUND OF THE INVENTION

Carbon and graphite refractories and mineral refractories containing elemental carbon are exceptionally suitable for applications requiring resistance to slags and metals at very high temperatures. Unfortunately, the high oxidation rate of carbon limits its usefulness to areas covered by molten materials where exposure to oxygen is minimized or to situations where the burning rate is tolerated with periodic replacement or frequent maintenance patching. Replacement requires cooling of the installation, whether a furnace, trough or spout, and consequent down time. Patching has always left much to be desired as the performance of the applied material is much dependent on preparation of the eroded surface, quality of the ramming or gunning placement techniques, care taken in drying or curing, heat up schedule, etc.

The use of brick linings in ladles, furnaces, and metal and slag runners is advantageous in providing refractories with maximum slag and metal resistance, superior in density to rammed or gunned materials and not subject to the dangers of a dry out or cure, as with wet rams and plastics or with materials deriving their bond from pitches. A carbon brick or block lining, however, requires constant maintenance to prevent their burning by overcoating with a variety of carbonaceous patching formulations, and their manufacture requires high temperature treatments under totally oxygen-free atmospheres at considerable expense in comparison with firing of clay-based brick.

Fluxing additions have been used to effect a seal on firing carbon bearing refractories, using glasses and sodium phosphates or silicates. This approach can protect a limited quantity of carbon (up to about 20 percent), requiring a siliceous matrix to form a glasslike coating on the refractory, which also limits the refractoriness of the body to that of the mineral components. Further, if brick containing fluxes were set closely in a kiln for firing, they would bond to each other and be difficult to separate.

There is considerable prior art regarding the use of silicon and ferrosilicon in fired shapes containing carbon. Most of this art shows a large silicon carbide content which is oxidation resistant but expensive and is not essential in our composition. Other prior art shows silicon and carbon compositions containing fluxing material such as feldspar or talc, which we avoid. Also, fired bodies have been made in which the silicon has been converted to silicon nitride, which is not formed by the process of this invention. Refractory brick has also been made with ferrosilicon and clay containing small amounts of carbon as an impurity, as disclosed in Veale U.S. Pat. No. 2,881,083, but such brick is essentially a clay brick with none of the desirable characteristics of a carbon brick or of applicants' clay brick containing high amounts of carbon.

It is the object of our invention to make a substantial improvement over the prior art by providing brick of very high carbon content, rendering them oxidation resistant by addition of silicon or ferrosilicon, so that they can be formed in a single batching operation combining carbon with the refractory matrix, and fired in a conventional oxidizing kiln, with improved performance in molten metal and slag exposures due to the high carbon content which is retained as a result of the inhibited oxidation. Further, the mechanical properties of these brick are much better than commercial refractory brick without carbon or all carbon brick, and the effective refractoriness of our brick with higher carbon content and without fluxing materials such as silica is that of an all carbon body, maintaining shape and size at temperatures in excess of 3,000°F without regard to the melting point of component clays and other constituents.

An additional object of our invention is to provide a prefired high carbon content refractory which will no longer steam or fume after installation, as in the manner of materials containing water or pitch for forming, thereby causing no drying or curing shrinkage, producing no strength lessening porosity, and requiring no equipment for collection of fumes.

Another object is to manufacture brick of high carbon content in a most economical manner; that is, by firing in an open kiln using a tight setting, allowing air passages for efficient heat transfer. Our compositions require neither costly saggering procedures nor inert atmosphere firing.

SUMMARY OF THE INVENTION

Shaped articles in the form of blocks such as brick or other shapes consisting essentially of a matrix of clay, grog, alumina, bentonite, bauxite, zircon or mixtures thereof with 20–80 percent amorphous carbon or graphite, preferably 40–60 percent, and 5–30 percent of silicon or ferrosilicon, preferably about 10 percent, are fired in a kiln to provide extraordinary oxidation resistance and strength. Firing the brick in a conventional kiln at ordinary firing temperatures for fired clay brick, as for example at about 2,550°F, gives these desired properties. Suitable firing temperatures are 2,400°F – 3,200°F, near or above the melting point of silicon (2,570°F), to achieve the oxidation protection. The shaped products should be brought through the range of oxidizing temperatures of 800°F – 2,500°F in no more than 4 hours, viz. 1–4 hours. Firing is preferably continued at above 2,500°F for at least 3 hours. The fired brick can then be employed in high temperature service under oxidizing conditions, with a very low rate of carbon burning and high strength for withstanding the impact of molten metals and slags.

Instead of firing the composition, the composition may include bonding agents such as sodium silicate, phosphoric acid, ammonium phosphates (preferably mono and diammonium phosphates), aluminum phosphates (preferably monoaluminum dihydrogen phosphate and others used in the art) in bonding amount such as 4–10 percent by weight. These shaped compositions are then dried to remove water, such as at above 212°F – 500°F.

PREFERRED EMBODIMENTS OF THE INVENTION

Blends of amorphous carbon and/or graphite with clays, grogs or more refractory components, such as zircon; and the powdered silicon source, are batched and pressed or extruded as a plastic mass, in the manner normal for manufacture of a refractory brick, block or special shape. Fluxes such as low melting silicates, except when used as bonding agents, are omitted from the composition. If water is used for ease of forming, the brick should be dried, followed by firing also in the manner of a high temperature noncarbon refractory shape.

A suitable refractory composition for firing consists essentially in weight percent of carbon 20–80 percent, silicon or ferrosilicon 5–30 percent, and the balance clay, grog, alumina, bentonite, bauxite, zircon or mixtures thereof. For unfired shaped compositions there is also present bonding amount such as 4–10 percent of bonding agents. Another suitable composition contains 5–20 percent plastic clay and 0–7 percent alumina or bauxite, and another 5–10 percent plastic clay and 5–70 percent zircon in addition to the silicon and carbon.

The oxidation protecting mechanism occurs at about 2,500°F, so a slow open firing will burn out much of the carbon before this temperature has been attained and is therefore preferably avoided. Preferably brick or shapes made according to our formulations should be brought through the range of temperatures of 800°F to 2,500°F in no more than about 4 hours, in which case no special kiln settings are required. The oxidized layer will generally be under ⅛ inch. At least 3 hours are preferred above 2,500°F for development of oxidation resistance and strength, with more time at temperature imparting more strength. Preferably the temperature is maintained at below 3,200°F, but it may be at the melting temperature of the clay.

A conventional, slow fire tunnel kiln for fire brick can be used with the acceptance of some surface oxidation. Preferably we use kiln settings similar to those shown in FIG. 1 and FIG. 2. These settings permit proper gas flow for maximum efficiency. The setting in FIG. 1 exposes the ends. The oxidized ends can be readily trimmed from an oversize unit, or tar impregnated, even pitch impregnated using a mortar with pitch. FIG. 2 illustrates a setting whereby one side is exposed leaving the opposite face protected by close setting. The protected side can then be placed for exposure to the severe environment in a lining. Where large size units are made for lining of ladles for holding molten iron, the end oxidation, using the setting of FIG. 1, would not be altogether significant, in view of the superior performance of all but at the most ½ to 1 inch of total thickness.

Figure 2:
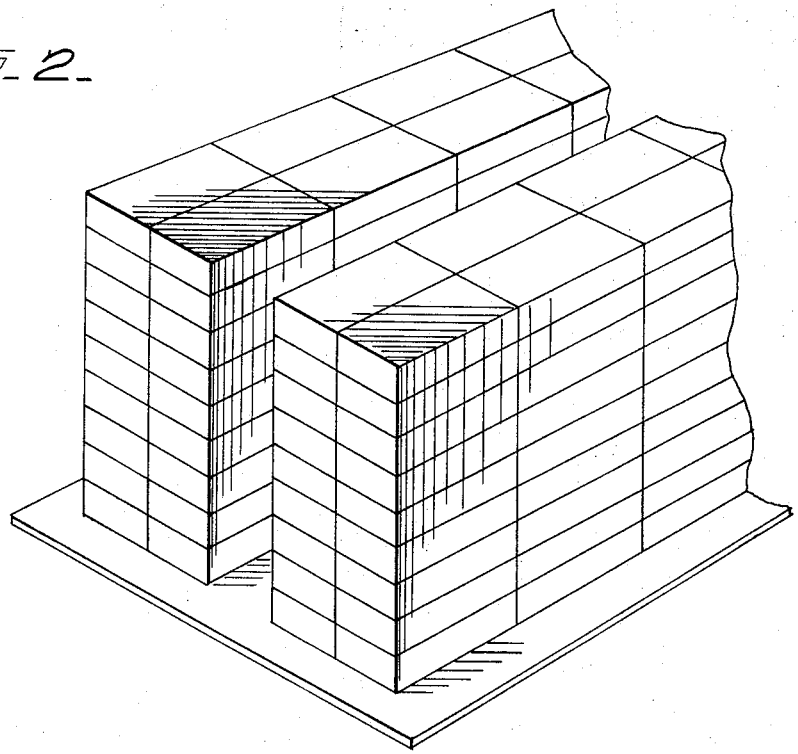

A row of 9 × 4½ × 2½ inch brick were fired in a conventional oxidizing tunnel kiln as shown in FIG. 1, but with sacrificial brick of 80 percent carbon and 20 percent fire clay on the top of each column. The cycle was 18 hours to temperature (cone 15, about 2,600°F). These bricks were formulated as follows:

53 percent — 1/16 in. and fines calcined flint clay
15 percent — plastic fire clay
5 percent — silica flour
20 percent — −60 mesh carbon
7 percent — −200 mesh silicon Carbon was burned out of the ends (2½ × 4½ in. faces) to a depth of just under one inch under these severe firing conditions. The carbon in the main central portion was intact. The density of the fired brick averaged 120 lbs./ft.$^3$, and the average modulus of rupture was 2,000 psi. Cold crushing strengths were in excess of 6,000 psi. These strengths are exceptional for brick of such low density.

FIG. 3 shows results on fast firing close set 9 × 4½ × 2½ in. brick with ends only exposed, 3 hours to 2,550°F, 5 hours hold, overnight cooling (at least 16 hours at above carbon oxidation temperatures on cooling). These brick contained 20 percent −60 mesh carbon; 15 percent raw fire clay; 0, 5 and 10 percent −200 mesh silicon (98 percent); with 65, 60 and 55 percent ⅛ in. diameter with minor amount of fines South American bauxite (89 percent alumina) respectively. The brick without silicon lost considerable carbon despite the close setting in the kiln. Five percent silicon gave considerable protection for firing, while brick with 10 percent silicon can take a relatively fast fire in a conventional kiln without significant carbon loss and displays little loss (12.4 percent of the original carbon) on full exposure on a refire at 2,550°F. The oxidation layer for total carbon burn-out on the fast fire is less than ⅛ inch.

The use of higher contents of carbon blended with clay and coarse grog gave particularly good strength to density relationships. A formulation of 30 percent carbon fines with 30 percent raw Missouri fire clay, 23 percent calcined clay grog (¼ in. and fines), 7 percent −200 mesh silicon metal (98 percent purity), and 10 percent pyrophyllite (−140 mesh) developed a fired modulus of rupture averaging nearly 2,000 psi with a 2 percent shrinkage.

Brick high in graphite content were formed containing 60 to 80 percent ¼ in. and fines graphite, 6½ percent bentonite and 3½ percent lignin liquor, the balance 10–30 percent silicon. The highest silicon content gave best protection, losing only 9 percent of the carbon on open firing, 3 hours to 2,550°F with a 5 hour hold. Oxidation losses are shown in FIG. 4. A specimen with 90 percent graphite, no silicon, was totally consumed.

Combining carbon or graphite with high alumina, minimum silica, using the silicon addition for protection of the carbon gave excellent results. An example formulation contained 20 percent fine amorphous carbon or graphite, 7 percent −200 mesh silicon, 50 percent 14 mesh tabular alumina, 18 percent −325 mesh calcined alumina and 5 percent bentonite. The brick, fired at 2,550°F, had densities of about 138 lbs./cu.ft. and flexural strengths of 1,250 psi (graphite) and 1,930 psi (carbon) with less than 0.1 percent shrinkage. Refiring to 2,550°F in an open kiln resulted in weight losses of approximately 20 percent of the original carbon. This performance with a small 9 inch brick unit with five sides exposed is quite unexpected in so refractory a body, containing no glass-forming fluxes.

Zircon-carbon formulations appear most oxidation resistant in fired brick form. Blending 20 percent amorphous carbon or graphite with 50 percent ¼ and fines zircon sand, 18 percent fine milled zircon, 7 percent silicon and 5 percent bentonite, forming brick, drying and firing close set at 2,550°F produced flexural strengths ranging from 2,000 to 2,700 psi and cold crushing strengths exceeding 6,000 psi. The fired densities were 166 lbs./cu.ft. (graphite) and 152 lbs./cu.ft. (carbon). The graphite formulation lost only 1 to 3 percent of the original carbon on open refiring to 2,550°F while the carbon formulation lost 7–9 percent.

The greater oxidation resistance of relatively coarse carbon and graphite, proven to be more readily protected by silicon and ferrosilicon additions than fine carbons, is the subject of the discussion of our copending application Ser. No. 241,785. In the case of brick manufacture as here disclosed, however, we can also use fine carbons and graphites taking advantage of the close setting of brick during the fire. Less oxidation loss in firing of the brick in an open kiln and in subsequent use as a refractory will occur if coarser carbons are used. The inorganic components of the brick will assist as a barrier to oxidation and result in less shrinkage if there is a relatively coarse component, such as a calcined clay, bauxite or crushed fire brick grog. These may vary in size from ⅜ in. and fines to 1/16 in. and fines. The silicon or ferrosilicon must be fairly finely divided, −60 mesh or finer, preferably as fine as −200 mesh. Good formulation for sufficient densification in the brick press or extruder would require at least 35 percent of the entire batch to pass through a 35 mesh screen, otherwise the resulting open porosity will increase the oxidation rate.

The effective refractoriness achieved by high carbon contents, regardless of the melting point of accompanying phases, was demonstrated by a series of eight brick formulations containing 10 to 80 percent graphite, in steps of 10 percent, the graphite being composed of equal parts of ¼ in. on 35 mesh and −35 mesh grain sizes, with 10 percent −200 mesh silicon in each case, and a cone 28 fire clay of decreasing concentration from 80 to 10 percent as the graphite was increased. The 9 × 4½ × 2½ in. brick were set on the 2½ × 4½ in. face and taken rapidly to 3,020°F (held about 3,000°F for two hours), above the melting point of the clay. Brick of up to 30 percent graphite slumped due to the melting of the clay. The other brick remained standing, quite intact, and graphite was present up to the edges. The shrinkage of all the brick in the 40 to 80 percent graphite range was about 1½ percent. The strengths decreased with increasing graphite, so that the formulation with 40 percent graphite was intact and quite strong (940 psi modulus of rupture) after this extreme treatment. The use of 40 to 80 percent carbon or graphite allows formulation with inexpensive plastic but low melting fire clays to produce a super refractory brick, and with the silicon addition it can be fired economically in an open tunnel kiln.

We claim:

1. The method of producing a high strength oxidation resistant shaped article which comprises forming a composition consisting essentially of 20–80 percent by weight of amorphous carbon or graphite, 5–30 percent silicon or ferrosilicon, and the balance of clay, grog, alumina, bentonite, bauxite, zircon or mixtures thereof to shape, and heating the shaped composition through a temperature of 800°F–2,500°F in no more than four hours and then heating at above 2,500°F for at least three hours.

* * * * *